United States Patent
Vijayaraghavan et al.

(10) Patent No.: US 8,899,040 B2
(45) Date of Patent: Dec. 2, 2014

(54) COMPRESSOR BYPASS

(75) Inventors: Shriram Vijayaraghavan, Evanston, IL (US); Scott Byron Fiveland, Metamora, IL (US); Martin Leo Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

(21) Appl. No.: 13/248,837

(22) Filed: Sep. 29, 2011

(65) Prior Publication Data

US 2013/0081391 A1    Apr. 4, 2013

(51) Int. Cl.
*F02B 33/44* (2006.01)
*F02G 3/00* (2006.01)
*F02D 41/00* (2006.01)
*F02B 37/16* (2006.01)

(52) U.S. Cl.
CPC .......... *F02B 37/168* (2013.01); *F02D 41/0007* (2013.01); *Y02T 10/144* (2013.01); *F02D 41/0027* (2013.01)
USPC .................................. 60/606; 60/614; 60/624

(58) Field of Classification Search
CPC ........ F02B 37/16; F02B 37/168; F02B 37/00; F02B 41/10; F02D 23/00; F02D 41/0007; F02D 41/0027; Y02T 10/144
USPC .................................. 60/614, 624, 606, 611
IPC ....................................................... F02B 41/10
See application file for complete search history.

(56) References Cited

U.S. PATENT DOCUMENTS

| | | | |
|---|---|---|---|
| 2,578,028 A | 12/1951 | Udale | |
| 2,848,866 A | 8/1958 | Geislinger | |
| 3,048,005 A | 8/1962 | Egli et al. | |
| 3,103,780 A * | 9/1963 | Tryhorn | 60/606 |
| 4,018,053 A | 4/1977 | Rudert et al. | |
| 4,112,684 A | 9/1978 | Tholen | |
| 4,233,815 A | 11/1980 | Melchior | |
| 4,287,717 A | 9/1981 | Oldfield et al. | |
| 4,391,098 A | 7/1983 | Kosuge | |
| 4,429,533 A | 2/1984 | Dinger | |
| 5,056,315 A * | 10/1991 | Jenkins | 60/614 |
| 5,649,517 A * | 7/1997 | Poola et al. | 123/585 |
| 5,724,813 A * | 3/1998 | Fenelon et al. | 60/611 |
| 6,324,846 B1 | 12/2001 | Clarke | |
| 6,360,732 B1 | 3/2002 | Bailey et al. | |

(Continued)

FOREIGN PATENT DOCUMENTS

| | | |
|---|---|---|
| DE | 3807372 | 9/1989 |
| JP | 63-045420 | 2/1988 |
| WO | 2008050178 A1 | 5/2008 |

OTHER PUBLICATIONS

A fully Certified English Translation to Christoph Mathey (Pub. No. DE 38 07 372 A1), published on Sep. 21, 1989.*

*Primary Examiner* — Thai Ba Trieu
(74) *Attorney, Agent, or Firm* — Finnegan, Henderson, Farabow, Garrett & Dunner LLP

(57) ABSTRACT

A power system includes a natural gas engine, a first turbine receiving an exhaust from the engine, and a second turbine having an inlet fluidly connected to an outlet of the first turbine. The power system also includes a compressor driven by the first turbine. The compressor has an outlet fluidly connected to the engine. The power system further includes a bypass system directing a fluid from the outlet of the compressor to the inlet of the second turbine.

14 Claims, 2 Drawing Sheets

(56) References Cited

U.S. PATENT DOCUMENTS

| | | |
|---|---|---|
| 6,470,864 B2 | 10/2002 | Kim et al. |
| 7,610,757 B2 * | 11/2009 | Onodera ................. 60/611 |
| 7,958,873 B2 | 6/2011 | Ernst |
| 8,141,361 B2 * | 3/2012 | Andersen ................. 60/611 |
| 8,602,742 B2 * | 12/2013 | Marx et al. ................. 60/611 |
| 2009/0139230 A1 | 6/2009 | Baldwin et al. |
| 2010/0100300 A1 | 4/2010 | Brooks et al. |

* cited by examiner

COMPRESSOR BYPASS

TECHNICAL FIELD

The present disclosure is directed to a power system and, more particularly, to a power system having a compressor bypass.

BACKGROUND

Internal combustion engines may be operated to generate power. In order to maximize the power generated by the internal combustion engine, the engine may be equipped with a turbocharged induction system. A turbocharged induction system may include a turbocharger having a compressor that compresses the air flowing into the engine. The turbocharger typically also includes a turbine connected to the compressor and driven by an exhaust of the engine. Since the intake air is compressed by the compressor, more air per unit volume may be forced into a combustion chamber of a turbocharged engine than possible with a naturally-aspirated engine. As a result, more power can be generated by a turbocharged engine than a naturally-aspirated engine of the same size.

In engines such as natural gas engines, engine speed or load is controlled by adjusting the flow of a mixture of air and fuel into the combustion chambers of the engine. When an increase in speed or load is desired, the flow of the air/fuel mixture to the natural gas engine is increased using a throttle valve or other like flow control device. On the other hand, if a decrease in engine speed or load is desired, the flow of the air/fuel mixture to the engine is decreased.

While reducing the flow of the air/fuel mixture to the natural gas engine may be useful in reducing engine speed or load, such flow reductions can have adverse effects in certain operating conditions. For example, if a relatively rapid decrease in engine speed or load is required, flow of the air/fuel mixture into the engine may be slowed relatively abruptly by the flow control device. The decreasing mass flow rate through the compressor at a set compressor pressure ratio results in an oscillating flow reversal within the compressor known as "compressor surge." Such compressor surge can be detrimental to component life and is not desirable.

In engines such as diesel engines, on the other hand, engine load or speed is controlled quite differently. Whereas the load or speed of a natural gas engine is controlled by manipulating the flow of the air/fuel mixture provided to the engine, the load or speed of a diesel engine is controlled by adjusting the amount of fuel that is injected into the respective combustion chambers of the engine. Since airflow is not manipulated in a diesel engine via, for example, an air flow control valve such as a throttle valve, the compressor is not subject to the decreasing mass flow at a given pressure ratio and, thus, the compressor is not forced into compressor surge. Thus, while compressor surge may have a profound impact on the functionality and efficiency of a natural gas engine, a diesel engine is not operated in a way that triggers compressor surge conditions.

One method of avoiding compressor surge in natural gas engines is to provide a bypass system, whereby excess compressed air/fuel mixture can be selectively released from downstream of the compressor. One such bypass system is shown in U.S. Patent Application Publication No. 2009/0139230 ("the '230 publication"). The system taught in the '230 publication includes a natural gas engine, and a turbocharger receiving a flow of exhaust from the engine. The exhaust is directed to a turbine of the turbocharger, and the turbine is connected to a compressor which assists in compressing a mixture of air and fuel upstream of an intake manifold of the engine. The system further includes a bypass line fluidly connected to an outlet of the compressor. The bypass line is configured to direct a portion of the compressed air/fuel mixture from the compressor outlet to an inlet of the compressor.

Although the system taught in the '230 publication may be useful in avoiding compressor surge, the disclosed system may result in energy loss in certain engine operating conditions. In particular, by directing a portion of the compressed air/fuel mixture back to a relatively low pressure area at the inlet of the compressor, the energy expended by the system to compress this portion of the mixture goes unused.

The power system of the present disclosure solves one or more of the problems set forth above.

SUMMARY OF THE INVENTION

In an exemplary embodiment of the present disclosure, a power system includes a natural gas engine, a first turbine receiving an exhaust from the engine, and a second turbine having an inlet fluidly connected to an outlet of the first turbine. The power system also includes a compressor driven by the first turbine. The compressor has an outlet fluidly connected to the engine. The power system further includes a bypass system directing a fluid from the outlet of the compressor to the inlet of the second turbine.

In another exemplary embodiment of the present disclosure, a power system includes a natural gas engine, and an air induction system including a compressor having an outlet fluidly connected to the engine. The power system also includes an exhaust system including a first turbine connected to the compressor, and a second turbine downstream of the first turbine and connected to an output member of the engine. The power system further includes a bypass system including a valve assembly configured to regulate a flow of compressed air from the compressor to the second turbine. The power system also includes a control system including a controller and at least one sensor. The controller is configured to operate the valve assembly in response to a signal received from the at least one sensor.

In a further exemplary embodiment of the present disclosure, a method of operating a power system includes generating a flow of compressed intake air, injecting natural gas into the flow of compressed intake air to form an air/fuel mixture, and combusting the air/fuel mixture in a natural gas engine. The method also includes directing a combustion exhaust from the engine to a turbine downstream of the engine and selectively directing a portion of the flow of compressed intake air to the turbine. The portion of the compressed intake air includes no natural gas and assists in rotating the turbine.

DETAILED DESCRIPTION

Figure 1:
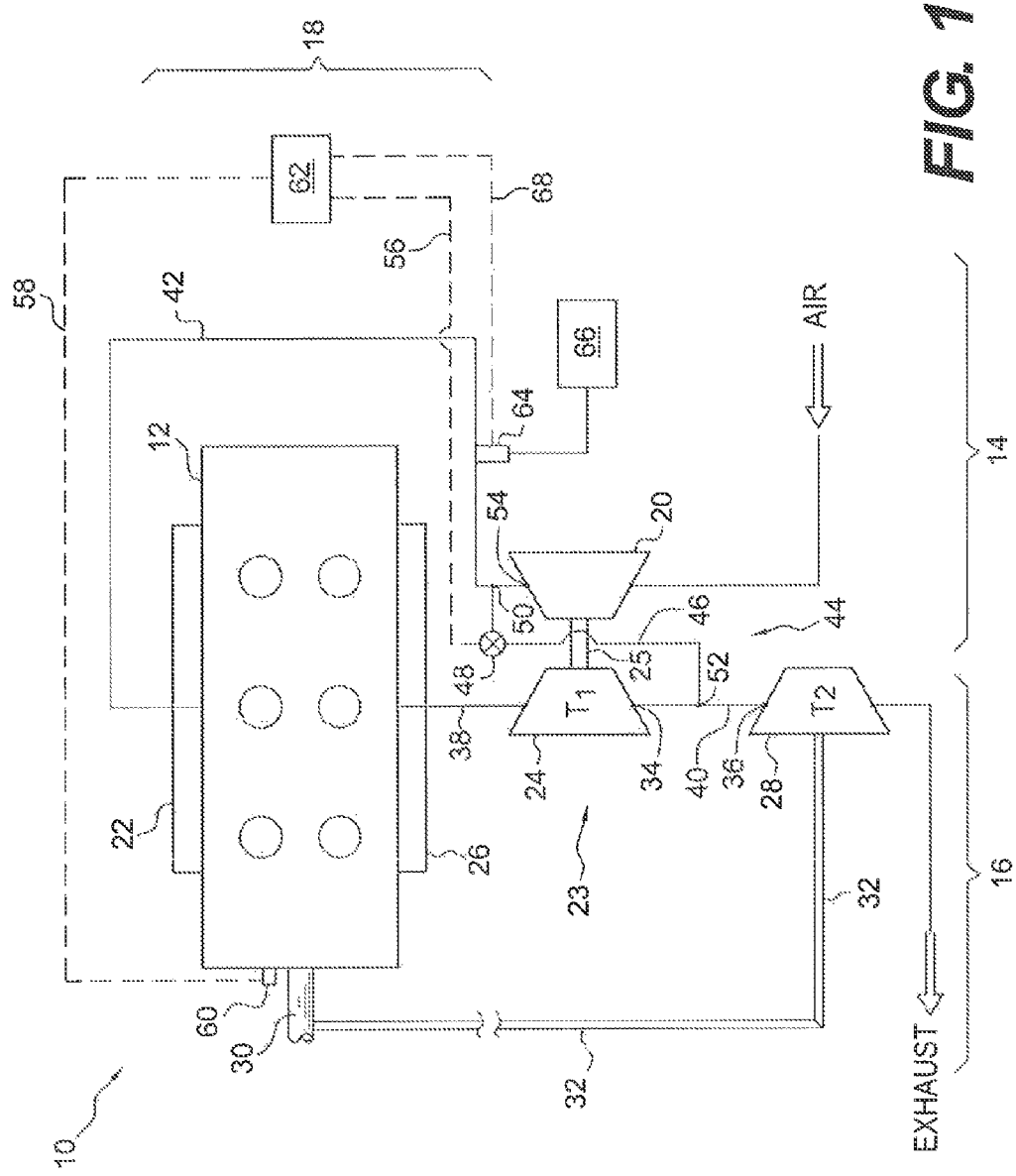
FIG. 1 is a diagrammatic illustration of an exemplary power system.
Figure 2:
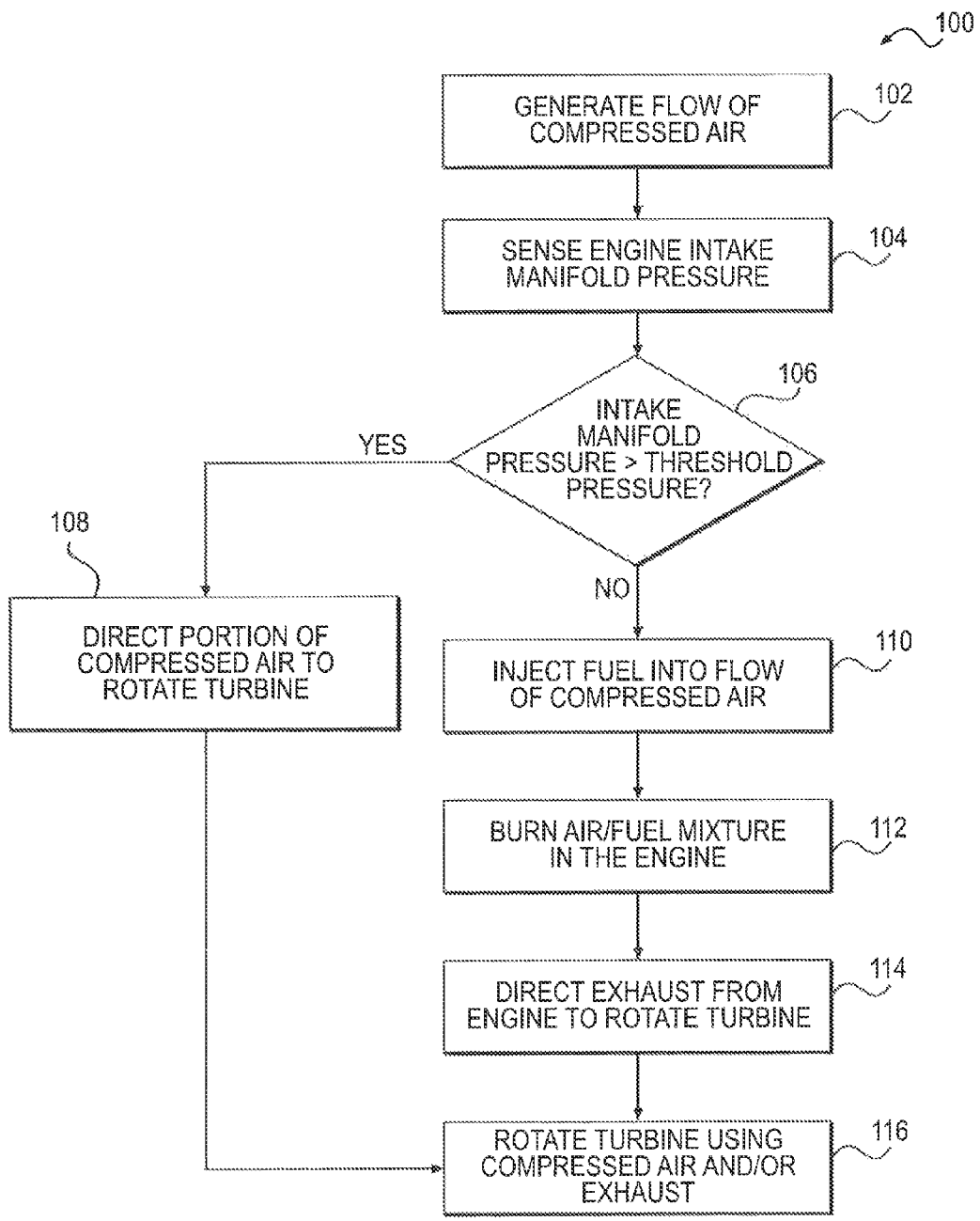
FIG. 2 is an exemplary flowchart illustrating a method of operating the power system of FIG. 1.

FIG. 1 illustrates an exemplary power system 10, and the power system 10 may include a power source 12. The power source 12 may embody an engine such as, for example, a natural gas engine. The power source 12 may receive intake air from an air induction system 14 and expel combustion byproducts to an exhaust system 16. The power system 10 may also include a bypass system 44 connecting the air induction system 14 to the exhaust system 16. The power system 10 may further include a control system 18 in communication with the power source 12, the bypass system 44, the air induction system 14, and/or the exhaust system 16.

The air induction system 14 may include a compressor 20 fluidly connected to an intake manifold 22 of the power source 12 to direct compressed air into the combustion chambers of the power source 12. The compressor 20 may include a fixed geometry-type compressor, a variable geometry-type compressor, or any other type of compressor known in the art. It is contemplated that more than one compressor 20 may be included in the air induction system 14, and such compressors may be disposed in parallel or in series relationship. Inlet air may be directed from the compressor 20 to the intake manifold 22 of the power source 12 by way a passageway 42. It is contemplated that additional components may be included within the air induction system 14 such as, for example, air coolers, throttle valves, air cleaners, and other components known in the art. As will be discussed in greater detail below, fuel may be mixed with the intake air compressed by the compressor 20 downstream of the compressor.

The air induction system 14 may further include one or more injectors 64 connected to a fuel supply 66. The injectors 64 may comprise any fuel input device known in the art, and the injectors 64 may be disposed anywhere downstream of the bypass system 44. In an exemplary embodiment, the one or more injectors 64 may be disposed within and/or otherwise fluidly connected to the passageway 42, and in a further exemplary embodiment, the one or more injectors 64 may be disposed within and/or otherwise fluidly connected to the intake manifold 22. In additional exemplary embodiments in which the power source 12 comprises a common rail-type port injection engine, the one or more injectors 64 may be disposed within and/or otherwise fluidly connected to ports (not shown) of the power source 12, and in still further exemplary embodiments in which the power source 12 comprises a direct injection engine, the one or more injectors 64 may be disposed within and/or otherwise fluidly connected to the combustion chambers (not shown) of the power source 12. The injectors 64 may be configured to inject pressurized or unpressurized fuel into a flow of compressed intake air, thereby forming a mixture of air and fuel. The injectors 64 may be configured to inject such fuel in liquid and/or gaseous form. The injectors 64 may be controlled to selectively inject any desired quantity of fuel, and may be operable to modify the fuel concentration of the mixture (i.e., lean or rich). In exemplary embodiments, the air induction system 14 may further include one or more carburetors, throttle valves, and/or other air/fuel ratio metering devices (not shown) configured to assist in regulating the fuel concentration of the mixture. One or more of such devices may also assist in regulating and/or otherwise controlling the flow of the air/fuel mixture into the power source 12. The air induction system 14 may also include one or more mixers, venturi tubes, pre-mixing chambers, and/or other like mixing devices (not shown) downstream of the injectors 64 to assist in forming a substantially homogeneous air/fuel mixture upstream of the power source 12.

The fuel supply 66 may comprise any sump, tank, canister, or other device configured to store and release combustible fuel. The fuel supply 66 may be pressurized or unpressurized, and the fuel stored therein may be in liquid or gaseous form. In exemplary embodiments, the fuel supply 66 may include one or more pumps and/or other like pressurization devices configured to assist in increasing a pressure of the fuel disposed therein and delivering a flow of pressurized fuel to the one or more injectors 64. The fuel supply 66, and/or a passageway fluidly connecting the fuel supply 66 to the one or more injectors 64, may include one or more valves, restrictions, and/or other like flow metering devices (not shown) configured to assist in providing a pressurized flow of fuel to the injectors 64. The type of fuel stored in the fuel supply 66 may depend on the type of power source 12 utilized, and in exemplary embodiments, such fuel may be natural gas, or other like fuels. The fuel supply 66 may be portable, and may be configured for transportation on, for example, on-highway trucks, off-highway trucks, excavators, and/or other like vehicles. The injectors 64, air/fuel ratio metering devices, mixing devices, pressurization devices, flow metering devices, and/or other components associated with the injectors 64 and/or the fuel supply 66 may be controllably connected to the control system 18 via a communication line 68.

The exhaust system 16 may include a turbocharger 23 having a turbine 24 fixedly connected to the compressor 20 by way of a shaft 25. Hot exhaust gases may be directed away from the combustion chambers of power source 12 via an exhaust manifold 26 that is fluidly connected to the turbine 24. The hot exhaust gases from power source 12 may expand against the blades (not shown) of turbine 24, and may drive rotation of the turbine 24 resulting in a corresponding rotation of the compressor 20. It is contemplated that more than one turbine 24 may be included within the exhaust system 16, and such additional turbines may be disposed in parallel or in series relationship. For example, the exhaust system 16 may include a second turbine 28 downstream of the first turbine 24. An inlet 36 of the second turbine 28 may be fluidly connected to an outlet 34 of the first turbine 24 such that the turbines 24, 28 are disposed in a series relationship. Exhaust gases from the combustion chambers of power source 12 may be directed from exhaust manifold 26 to the first turbine 24 via passageway 38, and from the first turbine 24 to the second turbine 28 via passageway 40.

In addition, the second turbine 28 may be connected to an output member 30 of the power source 12 via one or more gears, clutches, shafts, belts, joints, and/or other like linkage devices 32. In exemplary embodiments, rotation of the turbine 28 may assist in rotating the output member 30 and/or may otherwise provide torque and/or power to the power source 12. It is also contemplated that the exhaust system 16 may include additional components such as, for example, exhaust filtering devices, exhaust treatment devices, exhaust gas recirculation components, and other components known in the art.

The bypass system 44 may include a passageway 46 fluidly connecting an outlet 54 of the compressor 20 with the inlet 36 of the second turbine 28. In an exemplary embodiment, an inlet 50 of the passageway 46 may be fluidly connected to the passageway 42 downstream of the compressor outlet 54, and an outlet 52 of the passageway 46 may be fluidly connected to the passageway 40 upstream of the inlet 36.

The bypass system 44 may also include a valve assembly 48 disposed within and/or otherwise fluidly connected to the passageway 46. The valve assembly 48 may be configured to selectively fluidly connect the air induction system 14 and the exhaust system 16. For example, the valve assembly 48 may be operable to selectively fluidly connect the outlet 54 of the compressor 20 and the inlet 36 of the second turbine 28. In an exemplary embodiment, the valve assembly 48 may include numerous components (not shown) that function together to selectively vary the flow of fluid within the passageway 46. For example, the valve assembly 48 may include a housing, a valve element, an actuator, and/or other like fluid control components fluidly and/or otherwise connected to the passageway 46. One or more fasteners (not shown) may also be included in the valve assembly 48 to operably connect one or more of the above components to the passageway 46.

In exemplary embodiments, the actuator of the valve assembly 48 may be pneumatically operated to initiate movement of the valve element. Alternatively, the actuator may comprise one or more solenoids, piezoelectric actuators, and/or other known actuation devices. The actuator and/or other components of the valve assembly 48 may be controllably connected to the control system 18 via a communication line 56.

The control system 18 may include components configured to control the operation of the power system 10. In exemplary embodiments, components of the control system 18 may function to regulate the flow of fluid, such as compressed inlet air, from the induction system 14 to the exhaust system 16. In particular, the control system 18 may regulate, selectively vary, and/or otherwise control the flow of compressed inlet air through the bypass system 44 in response to one or more operational parameters of power system 10. The control system 18 may include one or more sensors 60 and a controller 62. The controller 62 may be in communication with the one or more sensors 60 via a communication line 58.

The one or more sensors 60 may be associated with the power source 12 to sense an operational parameter of the power source 12 and to generate a signal indicative of the parameter. These operational parameters may include, for example, a load and/or a speed of the power source 12. The load of the power source 12 may be sensed by monitoring a fuel setting of power source 12, by sensing a torque and speed output of the power source 12, by monitoring a timing of the power source 12, by sensing a temperature of the power source 12, or in any other manner known in the art. A speed of the power source 12 may be sensed directly with a magnetic pick-up type sensor disposed on and/or near the output member 30 of power source 12, or in any other suitable manner. It is contemplated that other operational parameters may alternatively or additionally be sensed by the one or more sensors 60 and communicated to controller 62 such as, for example, boost pressure, turbine speed, intake manifold pressure, fluid pressures downstream of the compressor 20, such as a pressure in the passageway 42, and/or other parameters known in the art. Such parameters may be associated with the various other components of the power system 10 in addition to the power source 12.

The controller 62 may be configured to receive the signal from the one or more sensors 60 and to selectively energize, deenergize, and/or otherwise control the actuator of the valve assembly 48 in response to the signal. Such selective control of the actuator may vary a position of the valve element to regulate flow through the passageway 46 in a closed-loop and/or an open-loop manner. For example, a signal from the one or more sensors 60 may indicate that the power source 12 is operating under low load and speed conditions where compressor bypass would not be beneficial. The controller 62 may cause the actuator to move to a first position, thereby causing the valve element to inhibit flow passing within the passageway 46. Conversely, if the signal from the sensor 60 indicates that the power source 12 is operating under high load and speed conditions where compressor bypass is beneficial to avoid compressor surge, the controller 62 may cause the actuator to move to a second position, thereby causing the valve element to permit flow within the passageway 46.

The controller 62 may be embodied in a single microprocessor or multiple microprocessors that include various components configured to assist in operating the turbocharger 23. Numerous commercially available microprocessors can be configured to perform the functions of the controller 62. The controller 62 could also be embodied in a general power system microprocessor capable of controlling numerous power system functions. The controller 62 may include a memory, a secondary storage device, a processor, and any other components for running an application and/or processing one or more control algorithms. Various other circuits may be associated with the controller 62 such as power supply circuitry, signal conditioning circuitry, solenoid driver circuitry, and other types of circuitry.

INDUSTRIAL APPLICABILITY

The systems and methods of the present disclosure may be applicable to any power system 10 where turbocharger efficiency and functionality throughout a range of operational conditions is desired. For example, the bypass system 44 may be configured to direct compressed intake air from a location downstream of the compressor 20 to a location upstream of the second turbine 28. This compressed intake air may assist in driving rotation of the second turbine 28. Thus, the energy expended by the air induction system 14 to compress the intake air may be recovered by the second turbine 28. Rotation of the turbine 28 may assist in rotating the output member 30 and/or may otherwise provide torque and/or power to the power source 12.

As another possible advantage, the present bypass system 44 may be operable to assist in avoiding compressor surge. For example, in operating conditions in which the compressor 20 compresses a greater volume of intake air than the power source 12 can process, such intake air may build-up in the passageway 42 and/or in the intake manifold 22. To avoid the build-up of intake air, the valve assembly 48 may be controlled to selectively direct a portion of the intake air acted on by the compressor 20 to a location upstream of the second turbine 28. The controller 62 may control operation of the valve assembly 48 to redirect this portion of the compressed intake air based on one or more signals received from the sensors 60 described above, and such control may be based on an open-loop and/or a closed loop control strategy. By controlling the valve assembly 48 in this way, compressor surge may be avoided.

As a further possible advantage, the bypass system 44 of the present disclosure may be configured to redirect compressed intake air to the exhaust system 16 before fuel has been injected into the intake air. For example, the inlet 50 of the passageway 46 may be fluidly connected to the passageway 42 at a desired distance upstream of the injector 64. Due to this configuration, operation of the valve assembly 48 may direct compressed relatively high-pressure intake air to the exhaust system 16 and substantially all fuel injected by the injector 64 may pass to the power source 12. Although many known natural gas engines include a bypass system configured to redirect compressor output, such engines typically inject fuel upstream of the compressor. As a result, the associated bypass system must redirect the compressor output to a location upstream of the compressor or the injected fuel will not reach the engine for combustion. Redirecting the compressor output to a location upstream of the compressor, however, does not allow such known natural gas engine systems to recover the energy and/or work expended to compress the intake air/fuel mixture. The systems of the present disclosure avoid the inefficiencies of such known natural gas engines.

In an exemplary method of use, exhaust from the power source 12 may pass to the first turbine 24 via the passageway 38. The exhaust may expand against the blades of the first turbine 24, and may drive rotation of the turbine 24 resulting in a corresponding rotation of the compressor 20. The rotation of the compressor 20 may draw intake air into the compressor 20. Compressed intake air may exit the compressor 20 via the passageway 42, and fuel may be injected into the flow of intake air by the injector 64. This compressed air/fuel mixture may then pass to the power source 12 for combustion.

During operation of the power source 12, the one or more sensors 60 may sense, for example, the speed, load, and/or torque of the power source 12. Such sensors 60 may also sense, for example, intake and exhaust manifold temperature, intake and exhaust manifold pressure, and/or a pressure of the passageway 42 downstream of the compressor 20. The sensors 60 may send signals indicative of such operating parameters to the controller 62, and the controller 62 may utilize such signals as inputs to one or more look-up tables, algorithms, and/or other known control devices/criterion to assist in controlling operation of the power source 12, the air induction system 14, the exhaust system 16, the bypass system 44, and/or the individual components thereof.

In an exemplary embodiment, the one or more sensors 60 may sense fluid pressure downstream of the compressor 20, such as, within the passageway 42 and/or within the intake manifold 22. The sensors 60 may send signals indicative of such intake pressure to the controller 62, and the controller 62 may compare the sensed intake pressures to a threshold pressure in a closed-loop manner. The threshold pressure may be associated with a maximum allowable pressure of the intake manifold 22, and sensed intake pressures above this threshold pressure may be associated with compressor surge.

For example, if the sensors 60 sense an intake pressure above the threshold pressure, the controller 62 may responsively control the actuator of the valve assembly 48 to open and/or otherwise vary a position of the valve element connected thereto. The position of the valve element may be selectively varied between an open position permitting flow between the compressor 20 and the second turbine 28, and a closed position blocking flow between the compressor 20 and the second turbine 28. For example, varying the position of the valve element may direct compressed intake air from a relatively high-pressure location proximate the outlet 54 of the compressor 20 to a relatively low-pressure location upstream of the second turbine 28. In exemplary embodiments, a fluid pressure within the passageway 40 between the first and second turbines 24, 28 may be less than a fluid pressure proximate the outlet 54 of the compressor 20, and this pressure differential may facilitate flow through the bypass system 44.

Controlling the position and/or movement of the valve element as described above may regulate flow through the passageway 46, and may assist in reducing the intake pressure to avoid compressor surge. In addition, directing the relatively high-pressure intake air from the outlet 54 of the compressor 20 to the inlet 36 of the second turbine 28 may assist in driving rotation of the second turbine 28. Rotation of the second turbine 28 may assist in rotating the output member 30 and/or may otherwise provide torque and/or power to the power source 12. As such torque and/or power is provided by capturing and/or otherwise recovering energy from compressed intake air, the bypass system 44 of the present disclosure assists in increasing the overall efficiency of the power system 10.

It will be apparent to those skilled in the art that various modifications and variations can be made in the power system 10 of the present disclosure without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of operating a power system, comprising:
generating a flow of compressed intake air;
injecting natural gas into the flow of compressed intake air to form an air/fuel mixture;
burning the air/fuel mixture in a natural gas engine;
directing a combustion exhaust from the engine to a turbine downstream of the engine sensing an intake manifold pressure associated with the engine;
comparing the sensed intake manifold pressure to a threshold pressure; and
adjusting a valve assembly in a bypass system to selectively direct a portion of the flow of compressed intake air to the turbine when the sensed intake manifold pressure is greater than the threshold pressure, wherein the portion of the compressed intake air includes no natural gas and assists in rotating the turbine.

2. The method of claim 1, further comprising directing the portion of the flow from a first location having a first fluid pressure to a second location having a second fluid pressure less than the first fluid pressure.

3. A power system, comprising:
a natural gas engine; a first turbine receiving an exhaust from the engine;
a second turbine having an inlet fluidly connected to an outlet of the first turbine;
a compressor driven by the first turbine, the compressor having an outlet fluidly connected to the engine;
a bypass system, comprising a valve assembly configured to selectively direct a fluid from the outlet of the compressor to the inlet of the second turbine;
a sensor configured to sense an intake manifold pressure associated with the engine; and
a controller operably connected to the valve assembly of the bypass system, wherein the controller is configured to compare the sensed intake manifold pressure to a threshold pressure and selectively control the valve assembly to effect fluid communication between the compressor outlet and the inlet of the second turbine when the sensed intake manifold pressure is greater than the threshold pressure.

4. The power system of claim 1, wherein the valve assembly comprises a valve element moveable between an open position permitting a flow of the fluid between the compressor and the inlet of the second turbine, and a closed position blocking the flow of the fluid between the compressor and the inlet of the second turbine, and an actuator operably connected to the valve element.

5. The power system of claim 1, wherein the valve assembly is fluidly connected to a first passageway extending from the compressor to the inlet of the second turbine.

6. The power system of claim 5, further comprising a second passageway extending from the outlet of the first turbine to the inlet of the second turbine, wherein an outlet of the first passageway is fluidly connected to the second passageway.

7. The power system of claim 6, wherein a fluid pressure within the second passageway is less than a fluid pressure proximate the outlet of the compressor.

8. The power system of claim 1, further including an injector configured to inject fuel at a location downstream of an inlet of the bypass system.

9. The power system of claim 1, wherein the second turbine is connected to an output member of the engine such that rotation of the second turbine assists in rotating the output member.

10. A power system, comprising:
a natural gas engine;
an air induction system including a compressor having an outlet fluidly connected to the engine;
an exhaust system including a first turbine connected to the compressor, and a second turbine downstream of the first turbine and connected to an output member of the engine;
a bypass system including a valve assembly configured to regulate a flow of compressed air from the compressor to the second turbine; and
a control system including a controller and at least one sensor, wherein the sensor is configured to sense an intake manifold pressure associated with the engine, and the controller is configured to compare the sensed intake pressure to a threshold pressure and to control the valve assembly of the bypass system to selectively effect fluid communication between the compressor outlet and the second turbine when the sensed intake manifold pressure is greater than the threshold pressure.

11. The power system of claim 10, wherein the valve assembly comprises a valve element moveable between an open position permitting flow between the compressor and the second turbine, and a closed position blocking flow between the compressor and the second turbine, and an actuator operably connected to the valve element.

12. The power system of claim 10, wherein the bypass system further comprises a passageway extending from the compressor to the second turbine, wherein the valve assembly is configured to regulate passage of the flow of compressed air through the passageway.

13. The power system of claim 10, further including an injector configured to inject fuel at a location downstream of an inlet of the bypass system.

14. The power system of claim 10, wherein the location downstream of the inlet of the bypass system comprises one of a combustion chamber of the engine and a port of the engine.

* * * * *